United States Patent Office 3,365,125
Patented Jan. 23, 1968

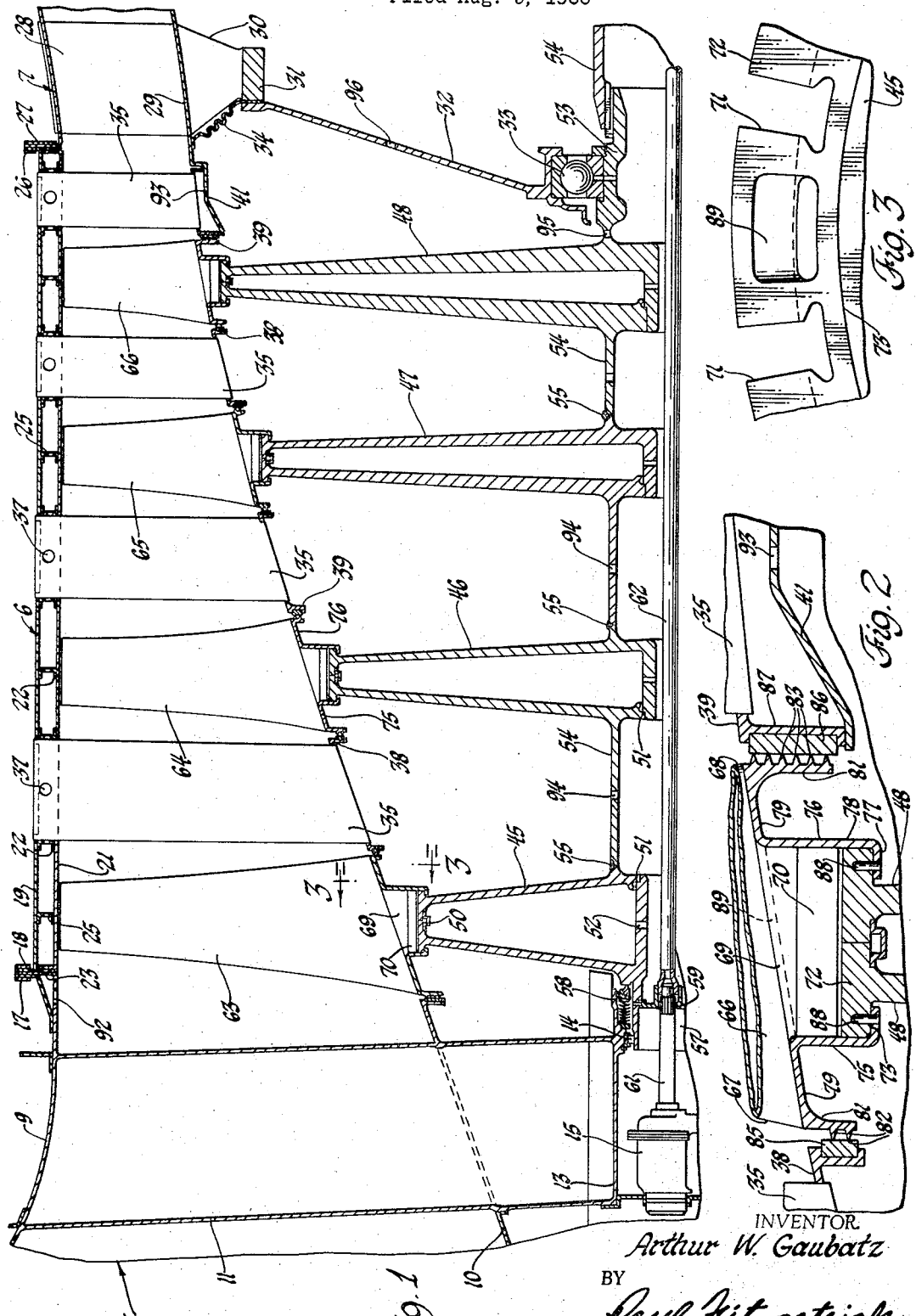

3,365,125
TURBOMACHINERY
Arthur W. Gaubatz, Indianapolis, Ind., assignor to General Motors Corporation, Detroit, Mich., a corporation of Delaware
Filed Aug. 3, 1966, Ser. No. 570,063
11 Claims. (Cl. 230—122)

My invention relates to turbomachinery, and particularly to an improved structure of an axial-flow compressor or turbine. The invention is particularly applicable to a lightweight high temperature turbomachine and has particular utility with respect to the provision of seals between the rotating and stationary parts and also the provision of a lightweight rotor structure. As applied to a compressor, cooling by inlet gas is also a feature of the invention.

The nature and advantages of the invention will be clear to those skilled in the art from the succeeding detailed description of the preferred embodiment of the invention and the accompanying drawings thereof.

FIGURE 1 is a partial longitudinal sectional view of an axial-flow compressor taken on a plane containing the axis of rotation of the rotor.

FIGURE 2 is an enlarged fragmentary view of the same.

FIGURE 3 is a fragmentary rear view of a rotor disk rim taken on the plane indicated by the line 3—3 in FIGURE 1.

FIGURE 1 illustrates a four-stage axial-flow compressor intended to be employed with inlet air which may be as hot as 1300° F., and which thus presents problems associated with high temperature operation much like those encountered in a turbine. Among these problems are the effect upon clearances of interstage seals of relative expansion between the rotating and stationary parts as operating conditions vary, particularly during transients of temperature or operation.

Considering the structure of the compressor in some detail, it includes an inlet housing and forward bearing support 5, an annular case 6, and an outlet diffuser section and rear bearing support 7. The inlet section 5 includes a converging outer wall 9 and a diverging inner wall or nose cone 10 with hollow struts 11 extending between these and extending within the nose cone to a cylindrical support 13. Support 13 mounts the outer race of a forward compressor roller bearing 14 and a lubricating oil pump 15. The inlet section 5 terminates in a bolting flange 17 which is bolted to the forward flange 18 of the compressor case 6.

This case is a double-walled structure, having an outer cylinder 19 and an inner cylinder 21, these being jointed together by channel section spaced rings 22 welded to the inner and outer walls of the case. It may be noted that holes 23 are provided through the bolting flange 18 and holes 25 through the spacer rings, providing for circulation of gas within the double-walled case. The case terminates in a bolting flange 26 which is fixed to a similar flange 27 at the forward end of the diffuser. Struts 28 extending through the diffuser support the inner wall 29 of the compressor outlet passage and tangentially inclined structs 30 connect wall 29 to a ring 31. A conical bearing support disk 32 bolted to ring 31 provides a support for the outer race of ball bearing 33 at the outlet end of the compressor. A circumferentially rigid flexible diaphragm 34 seals between the outer margin of ring 32 and the inner wall 30 of the diffuser. The case 6 may, of course taper.

The compressor stator comprises in this instance four rows of stator vanes 35 which are stab-mounted in the case; that is, they are pushed into mating openings in the inner and outer walls of the case and there welded in place. These vanes are of hollow sheet metal construction, closed at their radially outer ends, open at their radially inner ends, and with lateral vent openings 37 between the inner and outer walls of the compressor case. Each row of vanes is disposed between two of the spacer rings 22, which strengthen the mounting of the vanes. The inner ends of the vanes 35 of each row, as shown more clearly in FIGURE 2, extend through an inner shroud 38. The final or outlet vanes 35 have a double-walled shroud including an outer ring 39 and a radially inner ring 41. The inner ring 41 is integral with diffuser wall 29 and slides into ring 39.

In this particular embodiment of the invention, the stationary structure of the compressor between the inlet and outlet portions; that is, the case 6 and the vane rings on the case, are divided along two axially extending split lines so that the stator may be assembled around the rotor. It is to be understood, however, that the rotor structure of the invention may be employed with a compressor in which the stator is fully annular without a split line, and the successive stages of the stator are assembled into the case by sliding them axially along with the rotor as, for example, in the copending U.S. patent application of Castle et al. Ser. No. 481,842, filed Aug. 23, 1965, of common ownership with this application.

The rotor of the compressor comprises four stages having successive wheels or disks 45, 46, 47, and 48. These wheels are of a hollow type in which a forward disk is welded to a rear disk at the center of the rim at 50 and also at the hub as indicated at 51. The disks have vents 52. Wheel 48 is integral with a stub shaft 53 which is mounted in bearing 33 and is splined for coupling to a compressor driving shaft 54. The several wheels include stub shafts 54 which are welded together at 55. The wheels may, of course, be splined together. The wheel 45 includes a forwardly extending stub shaft 57 which is mounted in roller bearing 41. A contact type gas seal 58 of known type is mounted between the bearing 14 and the wheel 45. The oil pump 15 is driven by a disk 59 mounted in the stub shaft 57 driving the hollow pump shaft 61 through which the pump discharges oil into a hollow tie bolt 62 for distribution to engine bearings.

The rotor wheels 45 to 48 mount rings of rotor blades 63, 64, 65, and 66. These vary principally in dimensions. The general structure and mounting is the same for all stages. Referring also to FIGURE 2, the blade 66 has a leading edge 67 and a trailing edge 68 and is hollow, but of rather small thickness relative to the chord of the blade. The hollow blade 66 is fixed to a core 69 which includes a dovetail root 70. The root 70 mounts in an undercut slot 71 (FIGURE 3) extending across the rim 72 of the wheel. The rim 72 extends axially beyond the forward and rear faces of wheel 48, thus defining inwardly facing shoulders 73. The leading and trailing edge portions of the blade extend considerably in the axial direction beyond the rim, and the inner end of the blade and the periphery of the rim lie substantially in the tapering surface of revolution defining the inner boundary of the gas flow path. The wheel 48, like the other wheels, bears a forward sealing ring 75 and a rear sealing ring 76. Each sealing ring includes an axially extending portion or flange 77 which bears against the inner surface of the rim and a radially extending portion 78 which bears against the face of the rim and also against an end of the blade roots. Each ring 75 or 76 also includes a generally axially extending portion 79 which bears against the inner end of the leading or trailing edge portion of the blade and also includes a radially extending seal portion 81. Note that the forward seal portion 81 on wheel 48 bears two circumferential ridges 82 on its forward face to provide one portion of a labyrinth seal and the rear seal portion 81 bears a larger number of annular sealing ridges 83. The seal ridges 82 cooperate with an abradable ring 85 mounted on the rear face of the inner shroud 38 of the immediately preceding stator stage. The rear seal ridges 83 cooperate with an abradable sealing ring 86 mounted on the face of a flange 87 of the final vane stage inner shroud 39. These abradable rings are preferably of a readily abradable cellular structure.

The rings 75 and 76 are retained on the rotor by a number of circumferentially spaced radial pins 88 received in blind radial bores in the rim and passing through holes in the flange portion 77 of the ring. The circumferential force on the ring may be carried by hoop stress in the ring, which is continuous, and the ring is located by its piloted fit between the flange 77 and the shoulder 73 of the wheel. The ring portions 79 preferably contact or very closely approach the radially inner ends of the blades and define, with the rim periphery and the stator vane inner shrouds, the inner boundary of the gas flow path through the compressor. The seals between the stator and rotor are provided for the usual purpose of preventing flow bypassing the vanes and blades of the compressor caused by the pressure differential across the vane and blade rows. While it is usual to provide seals for this purpose, so far as I am aware the configuration described herein is a new structure and has substantial advantages. Because the clearance of the labyrinth seal is in the axial direction and the faces of the sealing rings 85 and 86 are radial, the stator or rotor of the turbomachine may expand radially with respect to the other without altering the clearance between the relatively rotating parts of the labyrinth seal, which should be maintained as small as possible.

It may further be noted that, in the preferred embodiment shown, the chord of the blade at the root is two or three times the width of the wheel rim. Viewed conversely, the rim is narrow and is of relatively light weight for the large blades, and the contour of the rotor is completed by the sealing rings 75 and 76 which are of light sheet metal. The rotor blades are preferably hollow and of minimum thickness, with radially tapered walls, to minimize the centrifugal load on the roots 70 and wheel rim. The wheel rims are reduced in weight by tapered holes 89 extending through the rim between the blade slots 71, as shown in FIGURES 2 and 3.

The structure by which the compressor is cooled has been partly described. The gas (in this case, air) entering the compressor inlet 5 can flow through a ring of holes 92 in the inlet section 7 and through the ring of holes 23 in the bolting flanges between the walls 19 and 21 of the case, proceeding rearwardly through the holes 25 in the spacer rings. This air enters the hollow vanes 35 through openings 37 and flows out the open inner ends of the vanes into the spaces between the rotor wheels. Holes 93 in the inner wall 41 of the last stator blade stage inner shroud permit the air to flow into the space between the final wheel 48 and the support disk 32. The compressor may be supplied with air at significant pressure, or pressure in the inlet may be the result of high forward speed of an aircraft, creating considerable ram pressure rise. Whatever the source of the pressure, the pressure in the inlet is sufficient to cause a stream of air to flow through the case and through the stator vanes. This air must exhaust to a lower pressure area. Cooling air can pass into the interior of the rotor through holes 94 in the stub shafts of the rotor wheels. Any leakage through the interstage seals such as 82, 85 (FIGURE 2) also flows through the holes 94 into the interior of the compressor shaft. It may be carried through the drive shaft 54 to a discharge point or be otherwise disposed of. The stub shaft 53 may be provided with holes 95 for the leakage through the final seal at 83, 86. If desired, bleed holes 96 in the support 32 may provide for discharge of the cooling and leakage air from the interior of the compressor. It is possible to discharge all the air from the forward stages outwardly through openings such as 95 and the holes 96 in the rear bearing support. This circulation of cooling air directly cools the stator and also increases the circulation of air past the rotor disks to reduce appreciably the temperature of the operating parts of the compressor.

It will be apparent to those skilled in the art from the foregoing description that my invention provides an improved lightweight structure, improved interstage seals, and highly desirable provisions for cooling of a compressor or other turbomachine.

The detailed description of the preferred embodiment of the invention for the purpose of explaining the principles thereof is not to be considered as limiting or restricting the invention, as many modifications may be made by the exercise of skill in the art.

I claim:

1. An axial-flow turbomachine comprising, in combination:

a wheel including a disk and a rim projecting axially from the disk to define an internal shoulder on the rim a ring of blades mounted on the rim, the radially inner ends of the blades lying substantially in a common surface of revolution with the periphery of the rim and extending axially of the wheel beyond the rim a sealing ring mounted on the rim having successively an axially extending portion bearing against the internal shoulder on the rim, a radially extending portion bearing against the face of the rim, a portion projecting from the rim lying against the inner ends of the blades, and a seal portion extending radially and a stator structure adjacent to the wheel including a part defining a radially extending surface the said seal portion and the said part being disposed in close face-to-face relation and having portions cooperating to define an interstage seal of the labyrinth type.

2. A turbomachine as recited in claim 1 in which sealing rings as defined are mounted on both ends of the rim.

3. A turbomachine as recited in claim 2 in which the periphery of the rim, the radially inner ends of the blades, and the projecting portions of the sealing rings all lie substantially in a common tapering surface of revolution.

4. A turbomachine as recited in claim 1 in which the periphery of the rim, the radially inner ends of the blades, and the projecting portion of the sealing ring all lie substantially in a common tapering surface of revolution.

5. A turbomachine as recited in claim 1 in which the sealing ring is coupled to the wheel by means locking them against relative movement axially of the wheel.

6. A turbomachine as recited in claim 5 in which the blades have dovetail roots mounted in undercut slots extending across the rim and the sealing ring blocks movement of the roots from the slots.

7. A turbomachine as recited in claim 6 in which the blades have dovetail roots mounted in undercut slots extending across the rim and the sealing ring blocks movement of the roots from the slots.

8. A turbomachine as recited in claim 1 in which the rim is provided with holes through the rim between the blades to lighten the rim.

9. An axial-flow compressor comprising, in combination:

an inlet for gas to be compressed a double-walled case extending downstream from the inlet means defining a passage from the inlet into the space between the walls of the case a rotor including at least one rotor stage downstream from the inlet within the case at least one stator stage downstream from the inlet including hollow vanes bridging the two walls of the case and extending from the inner wall to the rotor the vanes having openings into the space to admit gas from the space into the vanes and having outlets into the rotor for the gas at the inner ends of the vanes and the rotor having means to conduct the gas from the vane outlets.

10. A compressor as recited in claim 9 having a plural number of rotor stages and a plural number of stator stages.

11. A compressor as recited in claim 10 in which the rotor includes a shaft and means to discharge the gas from the vane outlets through the shaft.

References Cited

UNITED STATES PATENTS

| | | | |
|---|---|---|---|
| 2,625,367 | 1/1953 | Rainbow et al. | 253—39.1 |
| 2,720,356 | 10/1955 | Erwin. | |
| 2,738,921 | 3/1956 | Hausmann. | |
| 2,749,026 | 6/1956 | Hasbrouck et al. | 230—133 |
| 2,773,667 | 12/1956 | Wheatley | 230—134.3 |
| 2,896,906 | 7/1959 | Durkin | 253—39.1 |
| 3,146,938 | 9/1964 | Smith | 230—122 |

FOREIGN PATENTS

| | | |
|---|---|---|
| 586,392 | 11/1959 | Canada. |
| 1,021,265 | 11/1952 | France. |
| 610,314 | 10/1948 | Great Britain. |

HENRY F. RADUAZO, *Primary Examiner.*